US008161407B2

(12) United States Patent
Ulerich et al.

(10) Patent No.: US 8,161,407 B2
(45) Date of Patent: Apr. 17, 2012

(54) MULTIPLE SORTING OF COLUMNS IN A DISPLAYED TABLE IN A USER INTERACTIVE COMPUTER DISPLAY INTERFACE THROUGH SEQUENTIAL RADIAL MENUS

(75) Inventors: Rhys D. Ulerich, Austin, TX (US); Ian A. Williamson, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 433 days.

(21) Appl. No.: 11/686,447

(22) Filed: Mar. 15, 2007

(65) Prior Publication Data
US 2008/0229245 A1 Sep. 18, 2008

(51) Int. Cl.
*G06F 3/048* (2006.01)
(52) U.S. Cl. ............ 715/834; 715/815; 715/825
(58) Field of Classification Search ............ 715/834, 715/815, 825
See application file for complete search history.

(56) References Cited

U.S. PATENT DOCUMENTS

| 5,706,449 | A | * | 1/1998 | Liu et al. ............ 715/823 |
| 5,745,717 | A | * | 4/1998 | Vayda et al. ......... 715/834 |
| 5,774,121 | A | * | 6/1998 | Stiegler ............ 715/769 |
| 6,078,326 | A | | 6/2000 | Kilmer et al. |
| 6,812,940 | B2 | * | 11/2004 | Arnold ............ 715/817 |
| 7,117,451 | B2 | | 10/2006 | Sielken |
| 2003/0069900 | A1 | | 4/2003 | Hind et al. |
| 2006/0069603 | A1 | | 3/2006 | Williams et al. |

OTHER PUBLICATIONS

Outlook, Microsoft Outlook 2000, Copyright 1995-1999, Fig. 1-13.*

* cited by examiner

*Primary Examiner* — Andrey Belousov
(74) *Attorney, Agent, or Firm* — J B. Kraft; David A. Mims

(57) ABSTRACT

Multi-sorting of displayed columns representative of a tabular display is carried out by displaying a table of a plurality of columns, selectively displaying a first radial menu having a plurality of sectors, each sector representative of one of the plurality of columns, enabling a user to select one of the sectors, and responsive to a user selection of a sector for displaying a second radial menu of the plurality of sectors wherein the selected one sector is disabled, e.g. eliminated. This is continued through a sequence of subsequent radial menus until the user has selected the intended set of sequential columns for the multiple sorting.

12 Claims, 9 Drawing Sheets

MULTIPLE SORTING OF COLUMNS IN A DISPLAYED TABLE IN A USER INTERACTIVE COMPUTER DISPLAY INTERFACE THROUGH SEQUENTIAL RADIAL MENUS

TECHNICAL FIELD

The present invention relates to user interactive computer supported display technology and particularly to user-friendly Graphical User Interfaces (GUIs) for multiple sorting of displayed columns representing a tabular database.

BACKGROUND OF RELATED ART

The past generation has been marked by a technological revolution driven by the convergence of the data processing industry with the consumer electronics industry. This advance has been even further accelerated by the extensive consumer and business involvement in the Internet or World Wide Web (Web). As a result of these changes, it seems as if virtually all aspects of human endeavor in the industrialized world require human-computer interfaces. These changes have made computer directed activities accessible to a substantial portion of the industrial world's population, which, up to a few years ago, was computer-illiterate, or, at best, computer indifferent.

As a result of these changes, it has become necessary for increasing numbers of workers and consumers, who are limited in computer skills, to become involved with computer interfaces. Thus, for the past twenty years, the data processing industry has striven to make user interactive display interfaces to computers more and more user-friendly and user-intuitive. The computer industry has had considerable success in making word processing and hypertext Web page user interfaces easier to use. However, one interface function that has presented considerable complexities to GUI interface users has been operations relating to displayed columnar tables representative of databases, e.g. spreadsheets.

One particular source of discomfort to users has been sorting of the columns, especially multiple sorting involving a plurality of displayed columns. Multicolumn sorting requires the selection of a set of columns to be sorted and the selection of the sequential, ascending or descending, order in which the columns are to be sorted. Some conventional multi-sorting permits the user to select the columns and the sequential order of the sort by sequentially clicking on the column heading in the table of columns through mouse controlled pointers or cursors. These methods often consume a significant amount of the displayed table window area and create what may appear to be screen clutter to less experienced computer users. There are other routines involving sequences of displayed user interactive dialog boxes that require extra interactive user interface time.

SUMMARY OF THE PRESENT INVENTION

The present invention offers a user friendly computer controlled display interface for a multicolumn sorting operation conducted with a minimum number of steps and with minimum consumption of display window area.

In accordance with the present invention, an implementation involving the multi-sorting of displayed columns representative of a tabular display is carried out by the combination of means for displaying a table of a plurality of columns, means for selectively displaying a first radial menu having a plurality of sectors, each representative of one of the plurality of columns, means enabling a user to select one of the sectors, and means responsive to a user selection of a sector for displaying a second radial menu of the plurality of sectors wherein the selected one sector is disabled. The disabled one sector is preferably eliminated in said second radial menu.

There are provided further means enabling a user to select another of the sectors in the second radial menu, together with means responsive to a user selection of this another sector in the second radial menu for displaying a subsequent radial menu of the plurality of sectors wherein the selected one and another sectors are disabled. Also, the first, second and subsequent radial menus may be conveniently arranged as concentric.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
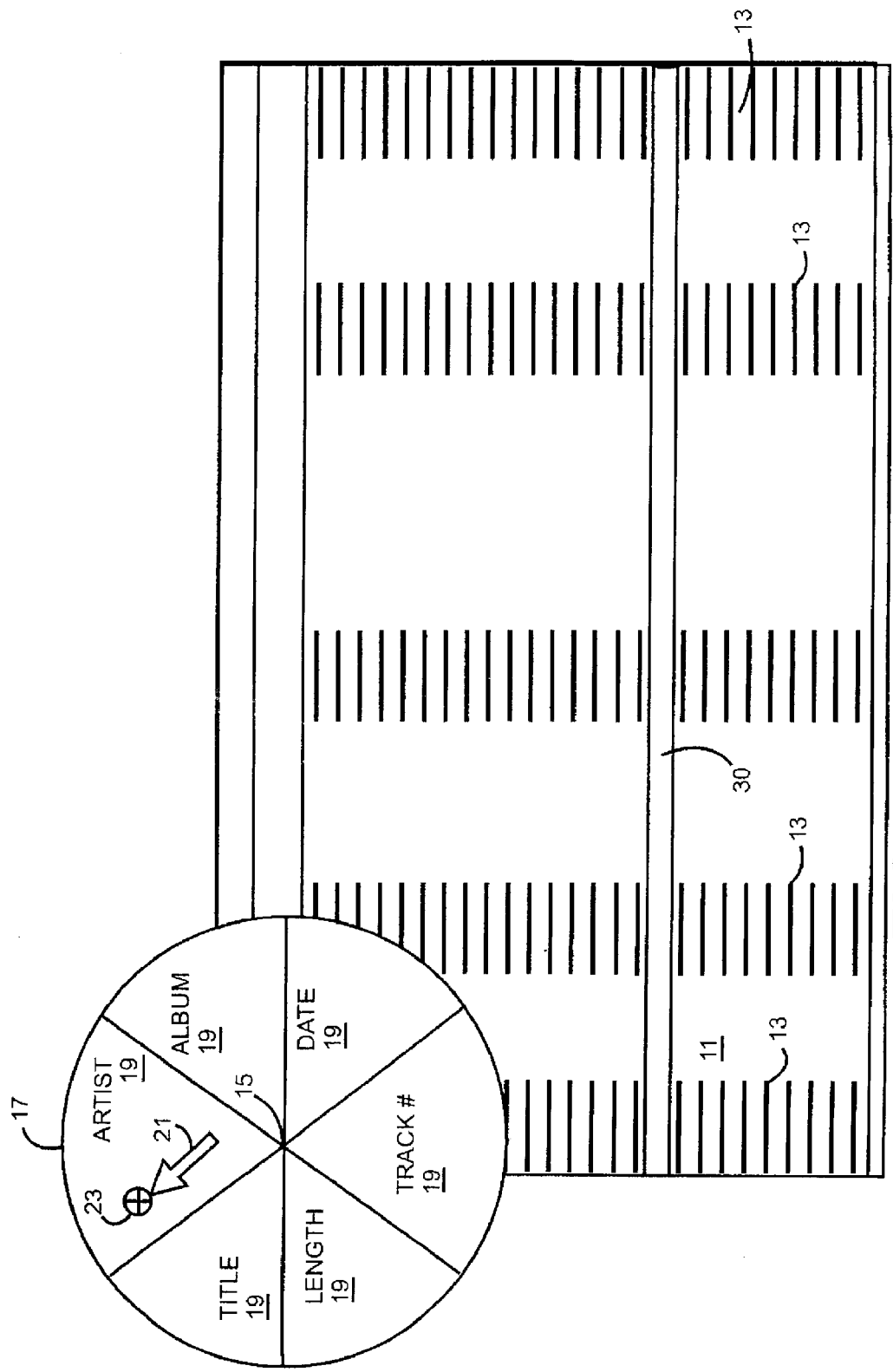
FIG. 1 is a diagrammatic view of a display screen illustrating an initial stage where the interactive user has triggered the display of a first radial menu and selected one sector in the menu representative of a first column.

There will now be described simplified illustrations of embodiments of the present invention with respect to the display screens of FIGS. 1 through 7. When the screen images are described, it will be understood that these may be rendered by storing image and text creation programs, such as those in any conventional window operating system, in the RAM 14 of the system of the present invention to be hereinafter described in greater detail with respect to FIG. 8. The controlling operating system is diagrammatically shown in FIG. 8 as operating system 41. The display screens of FIGS. 1 through 7 are presented to the viewer on display monitor 38 of FIG. 8. In accordance with conventional techniques, the user may control the screen interactively through a conventional I/O device, such as mouse 26 of FIG. 8, which operates through user interface 22 to call upon programs in RAM 14 cooperating with the operating system 41 to create the images in frame buffer 39 of display adapter 36 to control the display on monitor 38. The sequence of illustrative windows shown in FIGS. 1 through 3, and the images of radial menus illustrated in FIGS. 4 through 7 are generated using the data processing system to be described with respect to FIG. 8, in which there is provided an operating system with a conventional graphics engine, e.g. the graphics/text functions of WindowsXP™.

Figure 2:
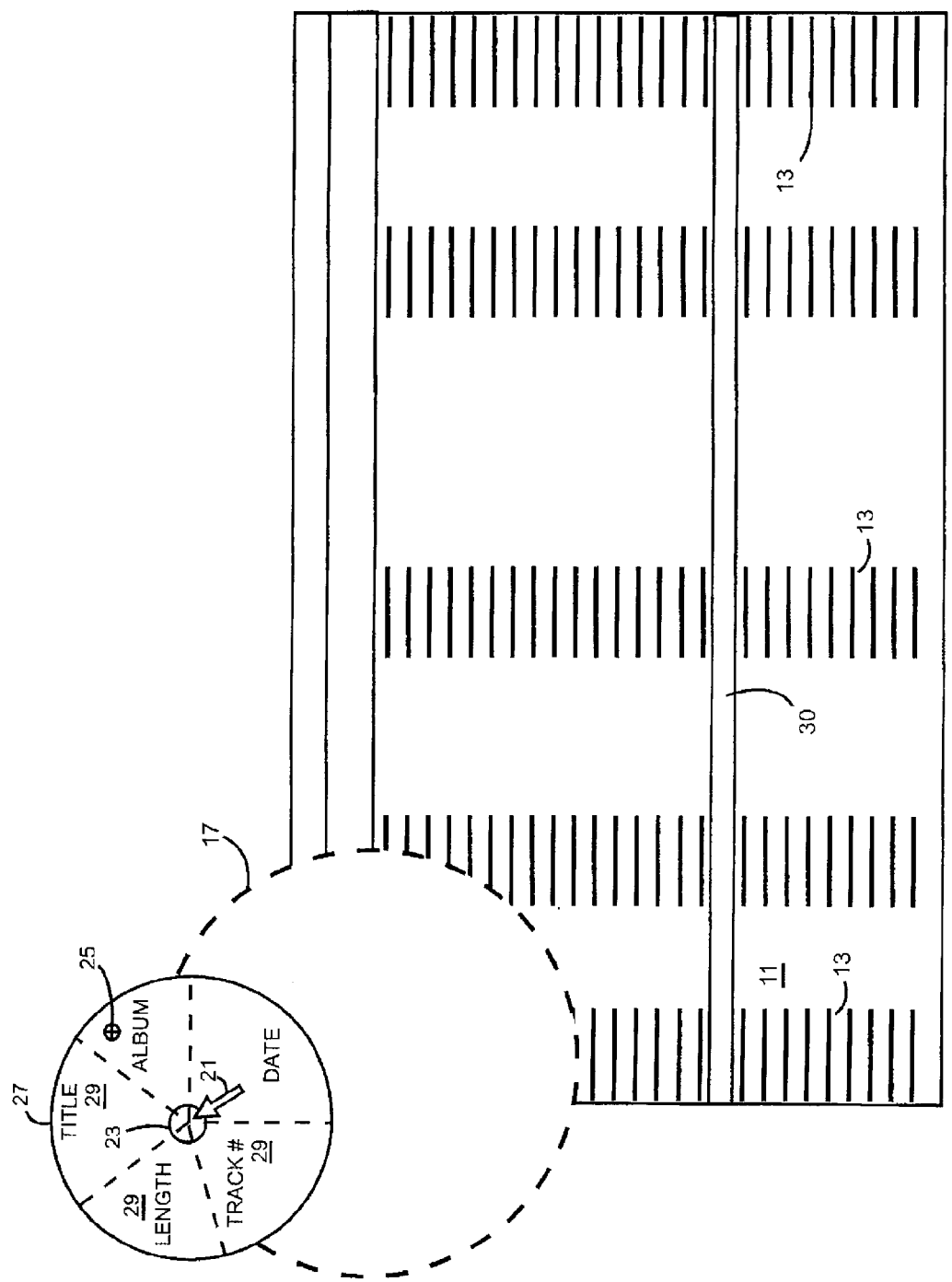
FIG. 2 is the view of FIG. 1 illustrating a later stage when the user has triggered the display of a second radial menu and selected another sector in the menu representative of a second column.

With reference to the display screen of FIG. 1, there is shown a simplified illustration of an initial display screen 11 in which the user has already activated radial menu 17. The screen has a spreadsheet of six columns 13, each column representative a category: Artist, Tracknumber, Title, Album, Date and Length in a tabular database. The user has an interest in an item represented by row 30 in the spreadsheet. The user wishes to do a multiple sort on this item. The user has already clicked on menu button 15 with his mouse controlled pointer that has triggered the display of radial menu 17, centered around button 15 in which each of the six columns: Artist, Tracknumber, Title, Album, Date and Length is respectively represented by its own sector 19. At this point, the user makes the first selection for the sequential multi-sorting of a set of columns: the user selects the Artist sector item from the radial menu by moving pointer 21 and clicking on point 23. Referring now to FIG. 2, this results in a next radial menu 27 being displayed, centered around point 23. Radial menu 27 now has five sectors 29: Tracknumber, Title, Album, Date and Length since the selected sector for Artist has been eliminated. The user then goes on to select (click on) point 25 in Album sector. This results in a next radial menu 37, FIG. 3, being displayed, centered around the selected point 25. Radial menu 37 now has four sectors 42: Tracknumber, Title, Date and Length since the second sequential selected sector for Album has been eliminated. At this point, the user may make a third or subsequent sequential selection by clicking on a point in any of the four remaining sectors 42. In this manner, the user may select a sequential set of columns to be multiple sorted. The set selected may comprise any number of selected columns up to the total number of columns in the spreadsheet 11.

Figure 3:
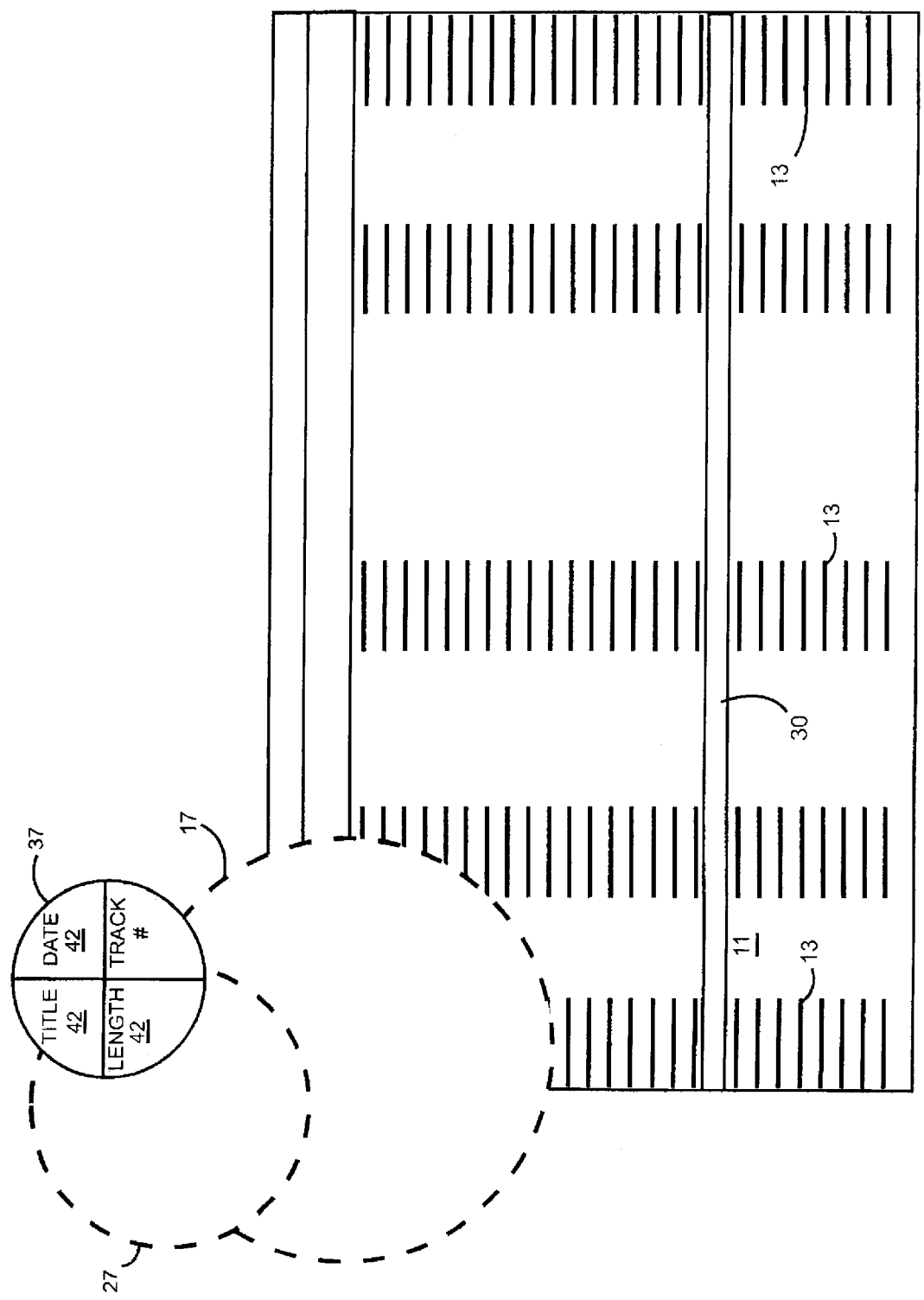
FIG. 3 is the view of FIG. 2 illustrating a later stage when the user has triggered the display of a subsequent radial menu.

The radial menus of FIGS. 1 through 3 may be considered to be displayed "pies", each having a plurality of wedges. To illustrate, the pie 17 of FIG. 1 has six wedges 19. Then, as the sequential selections are made as described with respect to FIGS. 1 through 3, the selected wedges are eliminated from the pie. Thus, the wedge 19 selected from menu 17 in FIG. 1 is eliminated from menu 27 in FIG. 2 to leave only five wedges 29, and in sequence the wedge 29 selected from menu 27 in FIG. 2 is eliminated from menu 37 in FIG. 3 to leave only four wedges 39.

Figure 4:
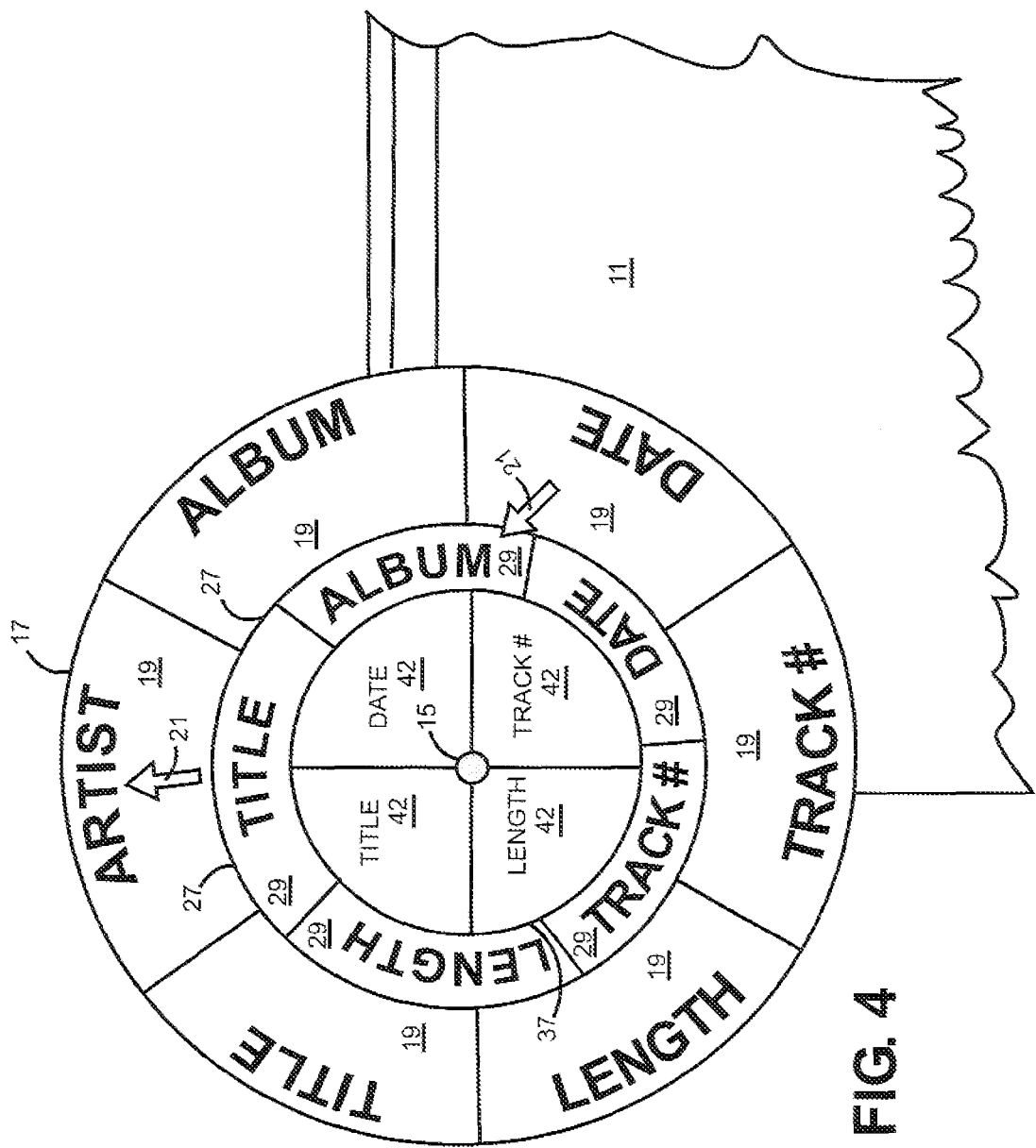
FIG. 4 illustrates a view similar to FIG. 3 showing the first, second and subsequent radial menus arranged as concentric menus.

While the sequence of radial menus in FIGS. 1 through 3 have been illustrated as non-concentric, the menus may have a concentric arrangement as shown in FIG. 4 with the three radial menus of FIGS. 1 through 3 being concentric with center menu button 15. The menus of FIG. 4 represent the identical sequence of radial menu selections as shown in FIG. 3 except that the menus are concentric.

Figure 5:
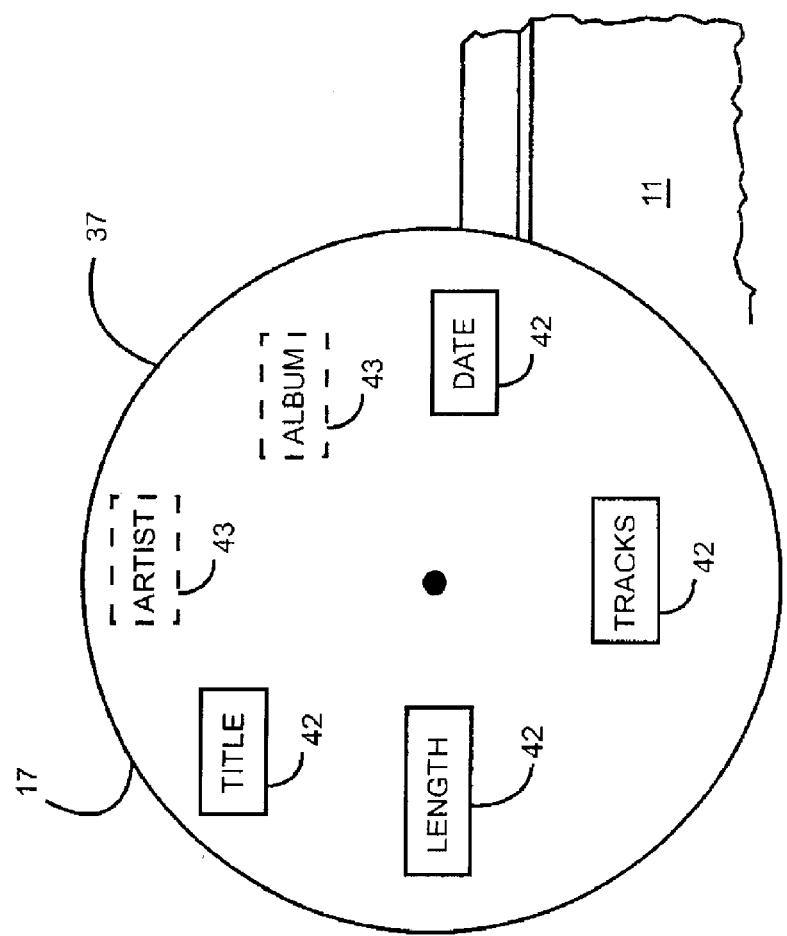
FIG. 5 is a view similar to FIG. 3 showing the first, second and subsequent radial menus as in FIG. 3, but with the disabled selected sectors being grayed out.

The sequence of radial menus in FIGS. 1 through 3 have been illustrated as being reduced in size due to the elimination of each selected sector from the next sequential radial menu to indicate that the sector has been disabled from further selection. The sequential radial menus need not eliminate the selected sectors. The selected sectors may just be grayed out, as shown in FIG. 5; wherein the three radial menus of FIGS. 1 through 3 may be of the same size with the two selected sectors 43 being grayed out. The superimposed menus of FIG. 5 represent the same sequence of radial menu selections as shown in FIG. 3 except that the menus are of the same size with the sequentially selected sectors 43 being grayed out.

Figure 6:
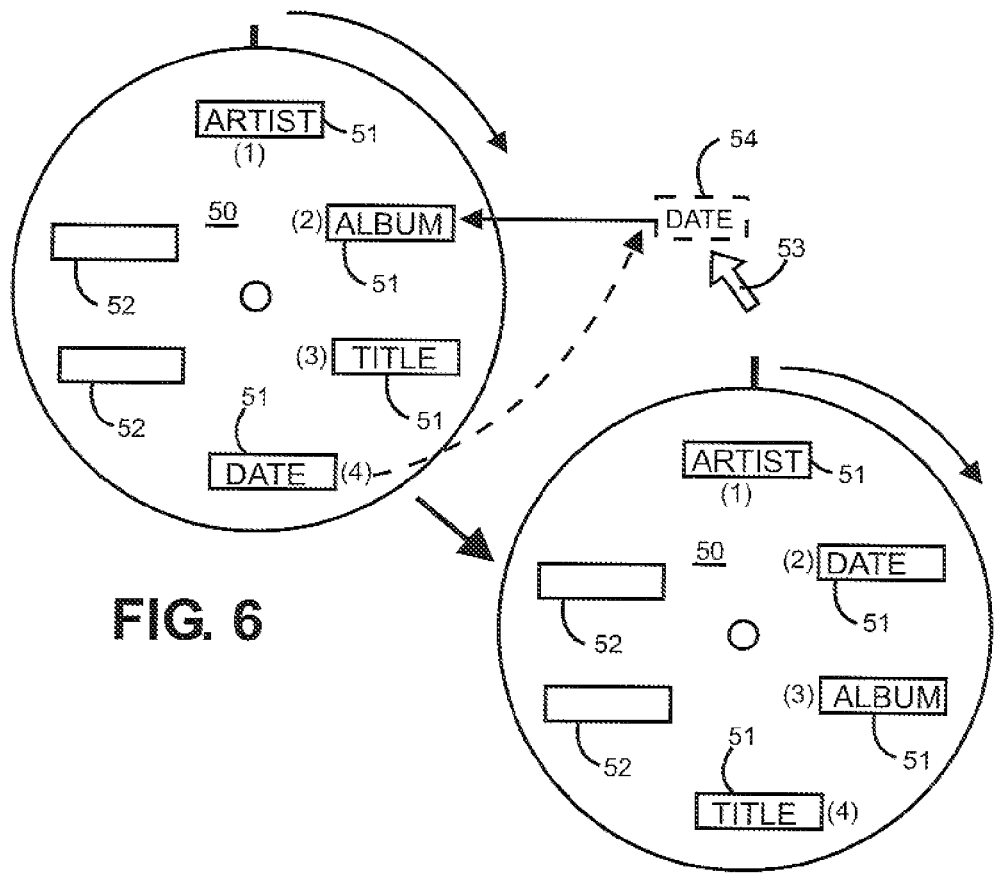
FIG. 6 is a diagrammatic view of a final radial menu on a display screen illustrating the order of the sequential multiple sort of the columns shown in radial sequence, and how the user may interactively change the order of the sequential multiple sort.

Once the interactive user has completed the selection of the sequential sectors representing the columns to be sequentially sorted in the column multiple-sorting, the system may display the sequence of the selections on a radial menu as shown in FIG. 6. This has an initial radial menu showing the sequence: (1)-(4) of the columns 51 selected to be sorted. Subsequent to the selection of the sequences shown in FIGS. 1 through 5, the interactive user, by any convenient means, e.g. by double clicking on the menu button 15, may bring up the display of FIG. 6. A set of four columns 51 have been selected to be sorted in the sequence shown. Two columns 52 have been unselected. Should the user, as herein, wish to change the sequential order of the multiple sorting, the user may drag and drop one of the sectors "Date" 54 via conventional cursor 53 movement shown by the dashed line from the (4) to the (2) position in the sorting to produce the changed multiple-sorting arrangement shown in the final arrangement of FIG. 6. This drag and drop implementation may be carried out by the standard WindowsXP™ implementations described hereinabove with respect to the conventional graphics engine, in the graphics/text functions of WindowsXP™.

Figure 7:
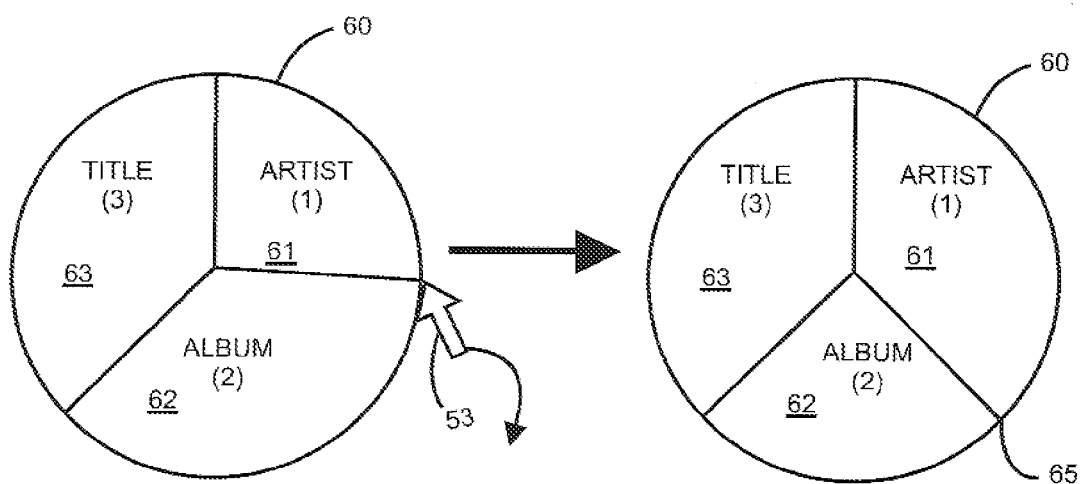
FIG. 7 is a diagrammatic view of a final radial menu on a display screen illustrating another order of the sequential multiple sort of the columns shown in radial sequence, and how the user may interactively change the weight of a column in the sequential multiple sort.

In connection with another embodiment of the invention, a radial menu, similar to FIG. 6, representative of a sort order (1)-(3) of three sectors 61, 62 and 63 in menu 60 in FIG. 7 may be used to change the size of a selected sector 61-63, and thereby change the weight accorded to the column represented by the sector. Note in FIG. 7, with the movement of dragging cursor 53 in the direction shown, the size of Artist sector (1) is expanded to border 65 to thereby increase the weight in the multiple sorting of the column represented by Artist section 61.

Figure 8:
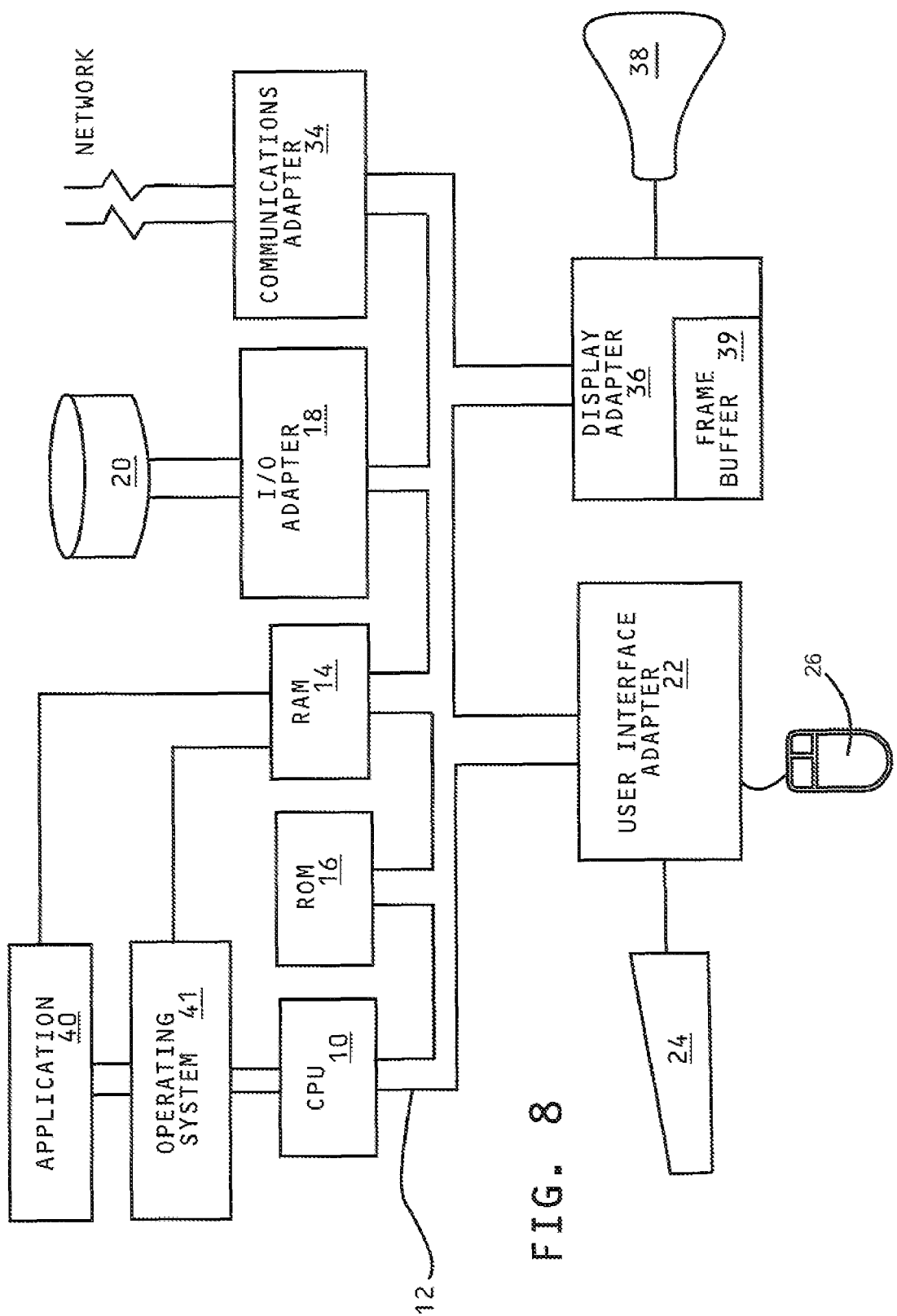
FIG. 8 is a block diagram illustrating an interactive data processor controlled display system including a central processing unit that is capable of implementing the user selected sequence of radial columns in the multiple sorting in accordance with the present invention.

Referring now to FIG. 8, a typical data processing system is shown that may function as the computer controlled display terminal used in implementing the system of the present invention for the sequential multiple-sorting of displayed columns through a sequence of radial menus. A central processing unit (CPU) 10, such as any PC microprocessor in a PC available from International Business Machines Corporation (IBM), Lenovo Corporation or Dell Corp., is provided and interconnected to various other components by system bus 12. An operating system 41 runs on CPU 10, provides control and is used to coordinate the function of the various components of FIG. 1. Operating system 41 may be one of the commercially available operating systems, such as Microsoft's WindowsXP™, as well as UNIX or IBM's AIX operating systems. Application programs 40 running on the data processing system run in conjunction with operating system 41 and provide output calls to the operating system 41, which, in turn, implements the various functions to be performed by the application 40. The programs and routines of the present invention, for the sequential multiple-sorting of displayed columns through a sequence of radial menus, to be subsequently described in greater detail, are among these application programs. A Read Only Memory (ROM) 16 is connected to CPU 10 via bus 12 and includes the Basic Input/Output System (BIOS) that controls the basic computer functions. Random Access Memory (RAM) 14, I/O adapter 18 and communications adapter 34 are also interconnected to system bus 12. It should be noted that software components, including operating system 41 and application 40, are loaded into RAM 14, which is the computer system's main memory. I/O adapter 18 communicates with the disk storage device 20, i.e. a hard drive. Communications adapter 34 interconnects bus 12 with an outside network enabling the data processing system to communicate with other such systems over a Local Area Network (LAN) or a Wide Area Network (WAN) which includes, of course, the Internet. I/O devices are also connected to system bus 12 via user interface adapter 22 and display adapter 36. Keyboard 24 and mouse 26 are all interconnected to bus 12 through user interface adapter 22. Mouse 26 operates in a conventional manner insofar as user movement is concerned. Display adapter 36 includes a frame buffer 39, which is a storage device that holds a representation of each pixel on the display screen 38. Images may be stored in frame buffer 39 for display on monitor 38 through various components, such as a digital to analog converter (not shown) and the like. By using the aforementioned mouse or related devices, a user is capable of inputting information to the system through the keyboard 24 or mouse 26 and receiving output information from the system via display 38.

Figure 9:
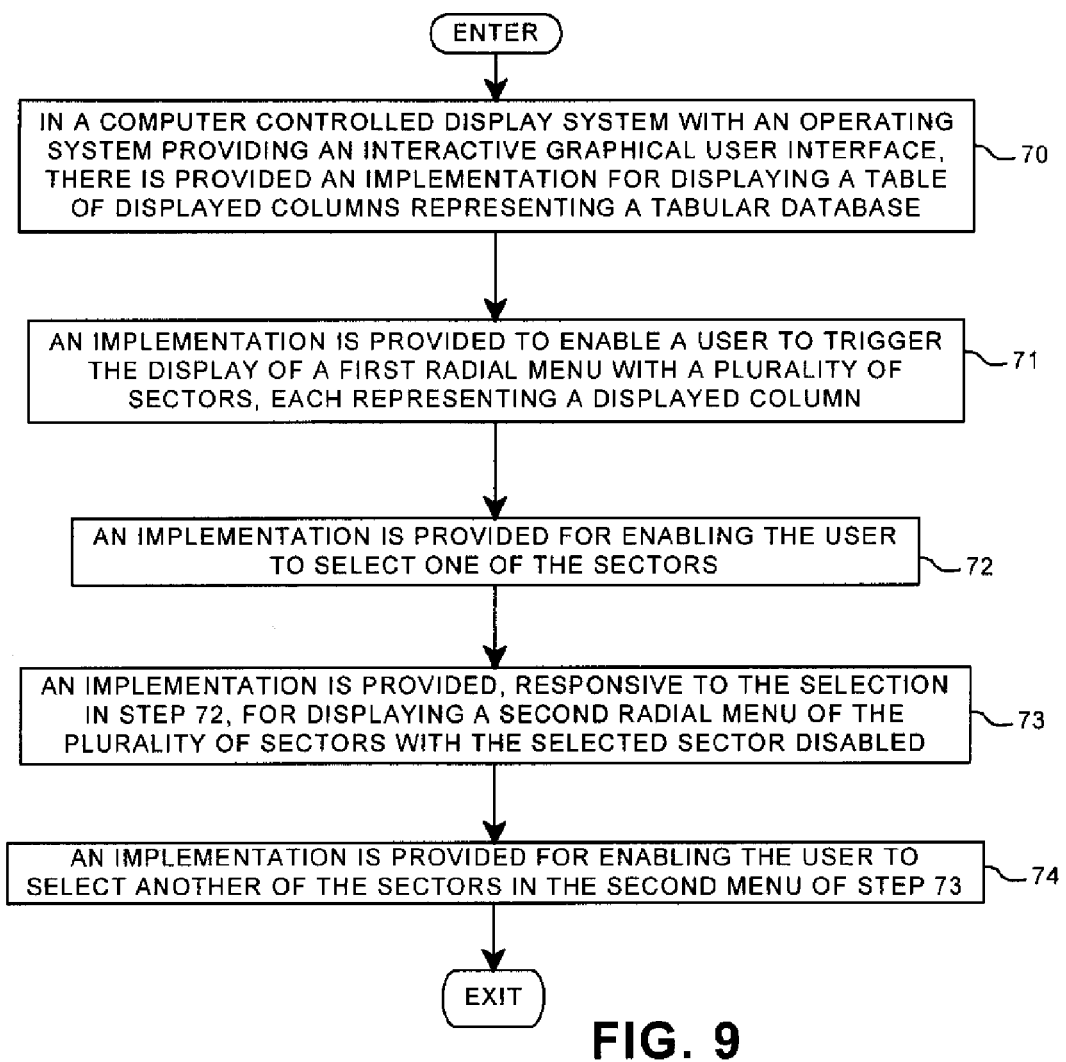
FIG. 9 is a flowchart illustrating the program steps involved in implementing the user selected sequence of radial columns in the multiple sorting in accordance with the present invention.

Now, with reference to FIG. 9, there will be described a process implemented by a program according to the present invention for a computer controlled display system during the running of application programs to provide a GUI for the sequential multiple sorting of displayed columns through a sequence of radial menus. An implementation is provided for displaying a table of columns representative of a tabular database, step 70. This table of columns may be produced by any conventional program embodiment for producing columns in a conventional spreadsheet layout, for example Microsoft's Excel™ in a WindowsXP™ environment.

An implementation is provided to enable a user to trigger the display of a first radial menu with a plurality of sectors, each representing a displayed column, step 71. An implementation is provided to enable a user to select one of the sectors, step 72. An implementation is provided, responsive to the selection in step 72, for displaying a second radial menu of the plurality of the sectors with the selected sector disabled, step 73. An implementation is provided, step 74, to enable a user to select another of the sectors in the second radial menu of step 73.

Figure 10:
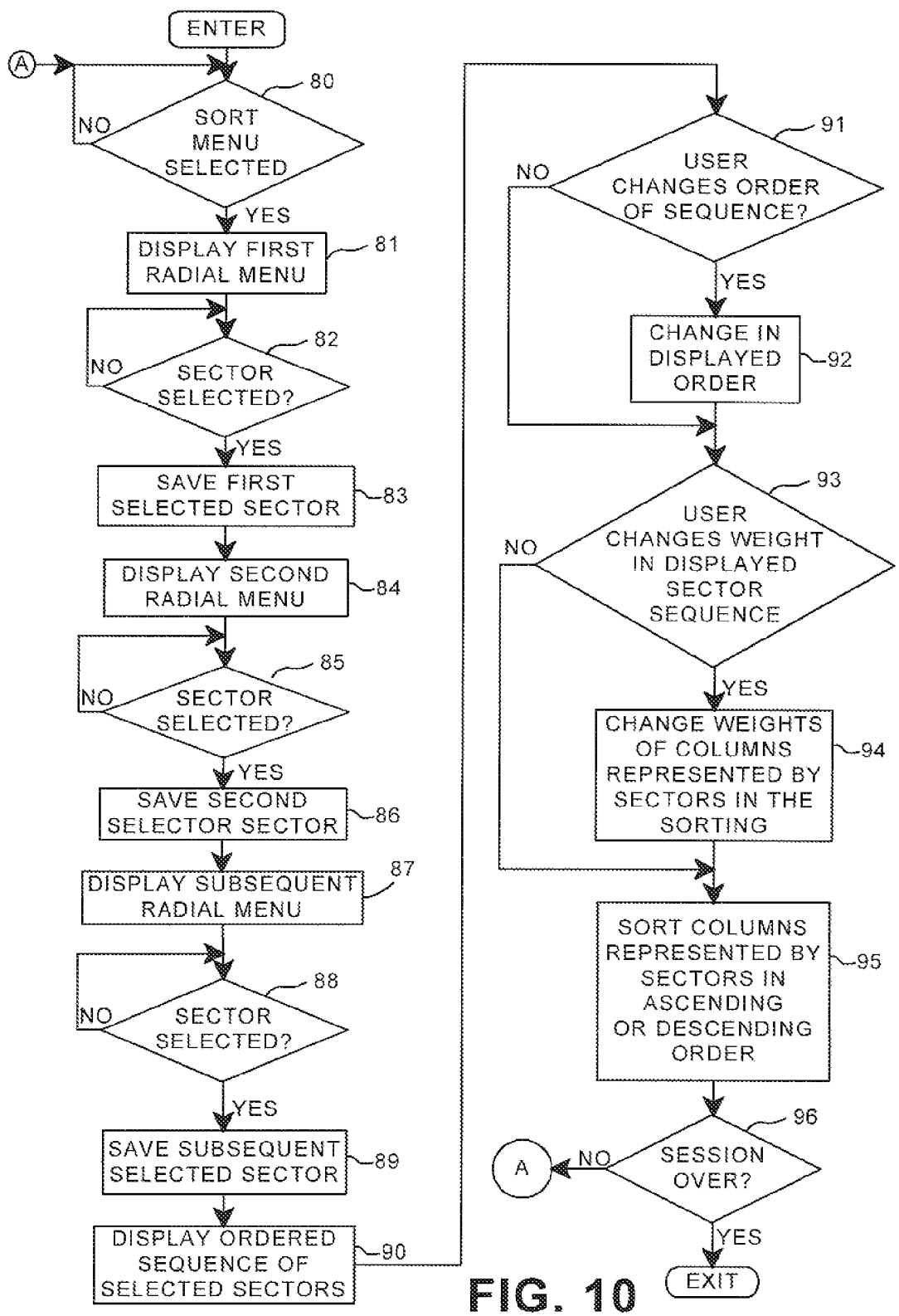
FIG. 10 is a flowchart of the steps involved in an illustrative run of the process set up in FIG. 9.

Now that the basic process has been described and illustrated, there will be described with respect to FIG. 10 a flow of a simple operation showing how the program could be run. The GUI screen is presented to the user and a determination is made as to whether the user has accessed a radial sort menu, step 80. If Yes, the first radial menu is displayed, step 81. A determination is made as to whether the user has selected a sector from the first radial menu, step 82. If Yes, the column represented by the sector is saved as the first sort column, step 83. Then, a second radial menu is displayed, step 84. A determination is made as to whether the user has selected a sector from the second radial menu, step 85. If Yes, the column represented by the sector is saved as the second sort column, step 86. Next, a subsequent radial menu is displayed, step 87. A determination is made as to whether the user has selected a sector from this subsequent radial menu, step 88. If Yes, the column represented by the sector is saved as the subsequent sort column, step 89. This process is repeated until the user has selected a sequence of subsequent columns to complete the intended multi-sorting. At this point, the sequence of selected columns is displayed. The sequence of columns may be displayed, step 90, as a sequence of (1) to (n) sectors in a radial menu as shown in FIG. 6 or 7. The user is given an opportunity to change the order of the sequence of radial sectors representing the sort sequence of the columns, step 91. If Yes, the user changes the order, the change in the order is shown in the radial sequence, step 92. Next, the user is enabled to change the weight of any sector in the intended multiple sort by moving representative sector boundaries in the radial menu as illustrated in FIG. 7, step 93. If Yes, the user changes sector boundaries, this is reflected in the sort weights to be given to the columns in the intended multiple sorting, step 94. The intended sort is then carried out in ascending or descending order as selected by the user, step 95. At this point, a determination is made as to whether the session is over, step 96. If Yes, the session is exited. If No, the process is returned via branch "A" to initial step 80.

One of the implementations of the present invention may be in application program 40 made up of programming steps or instructions resident in RAM 14, FIG. 1, of a Web receiving station during various Web operations. Until required by the computer system, the program instructions may be stored in another readable medium, e.g. in disk drive 20 or in a removable memory, such as an optical disk for use in a CD ROM computer input or in a floppy disk for use in a floppy disk drive computer input. Further, the program instructions may be stored in the memory of another computer prior to use in the system of the present invention and transmitted over a LAN or a WAN, such as the Web itself, when required by the user of the present invention. One skilled in the art should appreciate that the processes controlling the present invention are capable of being distributed in the form of computer readable media of a variety of forms.

Although certain preferred embodiments have been shown and described, it will be understood that many changes and modifications may be made therein without departing from the scope and intent of the appended claims.

What is claimed is:

1. In a computer controlled user interactive display system, a method for sequential multiple-sorting of displayed columns in a display interface representative of a tabular database comprising:

displaying a table of a plurality of columns, each column representing a data element of said database;

selectively displaying a first radial menu having a plurality of arcuate sectors, each sector representative of the data element represented in a corresponding one of said plurality of columns;

enabling a user to select one of said sectors; displaying a second radial menu of said plurality of sectors, responsive to a user selection of a sector, wherein said second radial menu is identical with said first radial menu except said selected one sector is disabled;

enabling said user to select another of said sectors in said second radial menu;

displaying a subsequent radial menu of said plurality of sectors, responsive to a user selection of said another sector in said second radial menu, identical with said first radial menu except said selected one and another sectors are disabled; wherein the order of selection in said sequence of said first, second, and subsequent radial menus determines the order of the multiple-sorting;

sorting said plurality of columns in said table by weight; and enabling the user to change a size of one or more of said sectors wherein a weight of the column represented by said changed sector in said sorting is charged.

2. The method of claim 1 wherein said disabled one and another sectors are eliminated.

3. The method of claim 2, wherein said first, second and subsequent radial menus are concentric.

4. The method of claim 2 further including the step of enabling the user to change a radial sorting order of said sectors in said first radial menu wherein the order of said sorting of the columns represented by said sectors is correspondingly changed.

5. A system including a computer controlled user-interactive display interface for sequential multiple-sorting of displayed columns representative of a tabular database, the system comprising:
- a processor;
- a computer memory holding computer program instructions which when executed by the processor perforin the method comprising:
- displaying a table of a plurality of columns, each column representing a data element of said database;
- selectively displaying a first radial menu having a plurality of arcuate sectors, each sector representative of the data element represented in a corresponding one of said plurality of columns;
- enabling a user to select one of said sectors;
- displaying a second radial menu of said plurality of sectors, responsive to a user selection of a sector, wherein said second radial menu is identical with said first radial menu except said selected one sector is disabled;
- enabling said user to select another of said sectors in said second radial menu;
- displaying a subsequent radial menu of said plurality of sectors, responsive to a user selection of said another sector in said second radial menu, identical with said first radial menu except said selected one and another sectors are disabled; wherein the order of selection in said sequence of said first, second, and subsequent radial menus determines the order of the multiple-sorting;
- sorting said plurality of columns in said table by weight; and
- enabling the user to change a size of one or more of said sectors wherein a weight of the column represented by said changed sector in said sorting is changed.

6. The system of claim 5 wherein said disabled one and another sectors are eliminated.

7. The system of claim 6, wherein said first, second and subsequent radial menus are concentric.

8. The system of claim 5 the performed method further includes the step of enabling the user to change a radial sorting order of said sectors in said first radial menu wherein the order of said sorting of the columns represented by said sectors is correspondingly changed.

9. A computer usable storage medium having stored thereon a computer readable program for sequential multiple-sorting of displayed columns representative of a tabular database on a computer controlled user-interactive display interface, wherein the computer readable program when executed on a computer causes the computer to:
- display a table of a plurality of columns, each column representing a data element of said database;
- selectively display a first radial menu having a plurality of arcuate sectors, each sector representative of the data element represented in a corresponding one of said plurality of columns;
- enable a user to select one of said sectors;
- display a second radial menu of said plurality of sectors, responsive to a user selection of a sector, wherein said second radial menu is identical with said first radial menu except said selected one sector is disabled;
- enable said user to select another of said sectors in said second radial menu;
- display a subsequent radial menu of said plurality of sectors, responsive to a user selection of said another sector in said second radial menu, identical with said first radial menu except said selected one and another sectors are disabled; wherein the order of selection in said sequence of said first, second, and subsequent radial menus determines the order of the multiple-sorting;
- sort said plurality of columns in said table by weight; and
- enable the user to change a size of one or more of said sectors wherein a weight of the column represented by said changed sector in said sorting is changed.

10. The computer usable storage medium of claim 9, wherein said disabled one and another sectors are eliminated.

11. The computer usable storage medium of claim 10, wherein said first, second and subsequent radial menus are concentric.

12. The computer usable, storage medium of claim 10, wherein the computer program when executed further causes the computer to enable the user to change a radial order of said sectors in said menu wherein the order of said sorting of the columns represented by said sectors is changed.

* * * * *